(12) United States Patent
Litis et al.

(10) Patent No.: US 9,869,391 B2
(45) Date of Patent: Jan. 16, 2018

(54) CARBON SEAL O-RING CAVITY SIZING

(75) Inventors: Paul T. Litis, West Hartford, CT (US);
David J. Avery, Hampden, MA (US);
Gregory P. Smith, Andover, CT (US);
John R. Gunn, Simsbury, CT (US);
David L. Kurtz, IV, Westfield, MA
(US); Kevin Brut, Westfield, MA (US)

(73) Assignee: Hamilton Sundstrand Corporation,
Windsor Locks, CT (US)

( * ) Notice: Subject to any disclaimer, the term of this patent is extended or adjusted under 35 U.S.C. 154(b) by 795 days.

(21) Appl. No.: 13/566,431

(22) Filed: Aug. 3, 2012

(65) Prior Publication Data

US 2013/0200570 A1 Aug. 8, 2013

Related U.S. Application Data

(60) Provisional application No. 61/515,428, filed on Aug. 5, 2011.

(51) Int. Cl.
*F16J 15/34* (2006.01)
*F16J 15/02* (2006.01)

(52) U.S. Cl.
CPC ............. *F16J 15/02* (2013.01); *F16J 15/348* (2013.01)

(58) Field of Classification Search
USPC .................... 277/312, 375, 372, 373, 390
See application file for complete search history.

(56) References Cited

U.S. PATENT DOCUMENTS

| 3,003,796 | A | * | 10/1961 | Meyer | 277/397 |
|---|---|---|---|---|---|
| 3,245,692 | A | * | 4/1966 | Voitik | 277/373 |
| 3,278,191 | A | * | 10/1966 | Gits et al. | 277/373 |
| 3,469,851 | A | * | 9/1969 | Enemark | 277/370 |
| 3,552,752 | A | * | 1/1971 | Lojkutz | 77/373 |
| 3,578,344 | A | * | 5/1971 | Yost | 277/373 |
| 3,652,183 | A | * | 3/1972 | Pottharst, Jr. | 415/231 |
| 3,689,083 | A | * | 9/1972 | Greenawalt | 277/372 |
| 3,784,213 | A | * | 1/1974 | Voitik | 277/373 |
| 3,897,957 | A | * | 8/1975 | Warner | 277/373 |
| 4,212,475 | A | * | 7/1980 | Sedy | 277/400 |
| 4,290,611 | A | * | 9/1981 | Sedy | 277/366 |
| 4,304,408 | A | * | 12/1981 | Greenawalt | 277/373 |
| 4,420,160 | A | | 12/1983 | Laham | |
| 4,477,088 | A | | 10/1984 | Picard | |
| 4,709,545 | A | | 12/1987 | Stevens et al. | |
| 5,174,584 | A | | 12/1992 | Lahrman | |
| 5,501,471 | A | * | 3/1996 | Ohba et al. | 277/379 |
| 5,813,830 | A | | 9/1998 | Smith et al. | |
| 6,142,478 | A | * | 11/2000 | Pecht et al. | 277/400 |
| 6,322,079 | B1 | * | 11/2001 | Mullaney, III | 277/371 |
| 6,655,695 | B1 | | 12/2003 | Sund et al. | |
| 6,679,678 | B2 | * | 1/2004 | Giesler et al. | 415/112 |
| 6,969,236 | B2 | * | 11/2005 | Giesler et al. | 415/230 |
| 7,754,350 | B2 | | 7/2010 | Freling et al. | |
| 7,946,590 | B2 | | 5/2011 | Dobek et al. | |

(Continued)

*Primary Examiner* — Eugene G Byrd
(74) *Attorney, Agent, or Firm* — Carlson, Gaskey & Olds, P.C.

(57) ABSTRACT

A carbon seal assembly includes a carbon seal element disposed about a central axis and that extends between a first end and a second end. The carbon seal element includes an inner step surface at an axial distance H1 with regard to the first end. An o-ring is adjacent to the inner step surface. The o-ring includes a cross-section diameter D2 such that a ratio H1/D2 is between 1.60-1.73.

20 Claims, 1 Drawing Sheet

(56) References Cited

U.S. PATENT DOCUMENTS

| | | |
|---|---|---|
| 8,490,982 B2 * | 7/2013 | Roche et al. ................. 277/430 |
| 2006/0033287 A1 | 2/2006 | Rago |
| 2006/0104806 A1 | 5/2006 | Giesler et al. |
| 2012/0319355 A1 * | 12/2012 | Blewett et al. ............... 277/372 |

* cited by examiner

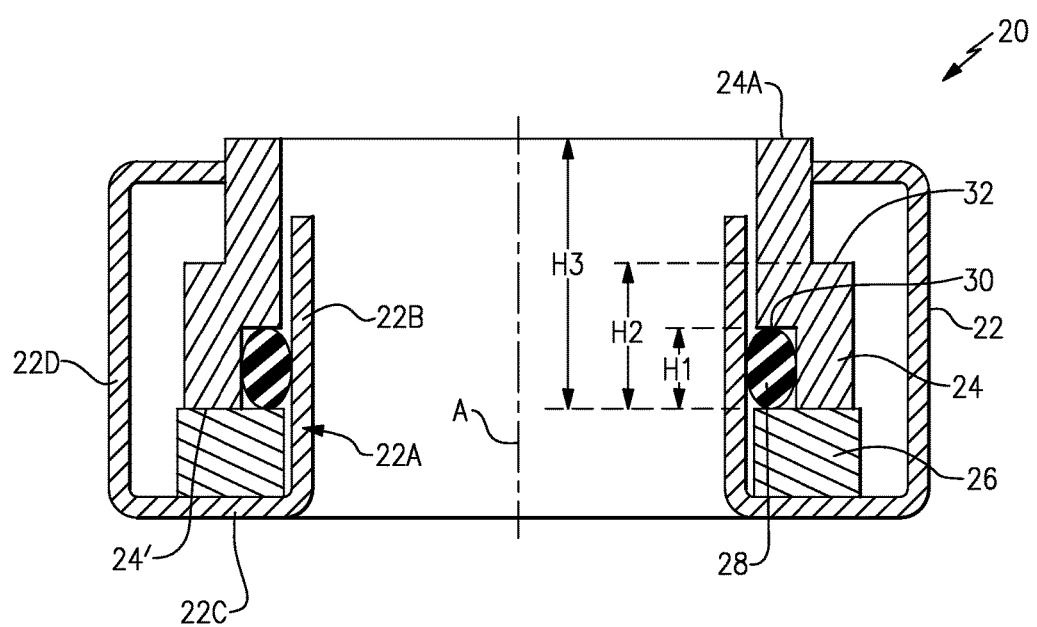

CARBON SEAL O-RING CAVITY SIZING

CROSS REFERENCE TO RELATED APPLICATION

This application claims priority to U.S. Provisional Application No. 61/515,428 that was filed on Aug. 5, 2011.

BACKGROUND

The present disclosure relates to a seal assembly, and more particularly to a carbon seal.

Seals are frequently used in aircraft gas turbine engines, industrial gas turbines or other machines. A carbon seal is of significant importance to performance and is supported to minimize distortion due to thermal and pressure effects.

SUMMARY

Disclosed is a carbon seal assembly that includes a carbon seal element disposed about a central axis and that extends between a first end and a second end. The carbon seal element includes an inner step surface at an axial distance H1 with regard to the first end. An o-ring is adjacent to the inner step surface. The o-ring includes a cross-section diameter D2 such that a ratio H1/D2 is between 1.60-1.73.

In another aspect, a carbon seal assembly includes a carbon seal element disposed about a central axis and that extends between a first end and a second end. The carbon seal element includes an inner step surface, an outer step surface, an axial distance H1 from the first end to the inner step surface, an axial distance H2 from the first end to the outer step surface and an axial distance H3 from the first end to the second end. H1 is greater than or equal to 35% of the axial distance H3 and H2 is greater than or equal to 60% of the axial distance H3.

Also disclosed is a method for controlling leakage in a carbon seal assembly. The method includes providing a carbon seal element disposed about a central axis and that extends between a first end and a second end. The carbon seal element includes an inner step surface at an axial distance H1 with regard to the first end and an o-ring adjacent to the inner step surface.

The o-ring includes a cross-section diameter D2. Leakage of a fluid by the o-ring is limited by establishing a ratio H1/D2 that is between 1.60-1.73.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 1 is a cross-sectional view of a carbon seal assembly.

DETAILED DESCRIPTION OF THE PREFERRED EMBODIMENT

FIG. 1 illustrates an example carbon seal assembly 20. As will be described, the carbon seal assembly 20 includes features for limiting fluid leakage, such as oil.

The carbon seal assembly 20 in one embodiment includes a carbon seal element 24. The carbon seal element 24 is disposed about a central axis A and extends from a first end 24' to a second end 24A, which serves as a seal face.

The carbon seal element 24 includes an inner step surface 30 and an outer step surface 32. The inner step surface 30 and the outer step surface 32 are each substantially perpendicular to the central axis A.

In the embodiment shown in FIG. 1, the carbon seal element 24 is arranged with additional components. That is, the carbon seal assembly 20 is considered in one embodiment to include the carbon seal element 24 and in other embodiments to include the carbon seal element 24 in arrangement with other components.

In the example shown, the carbon seal assembly 20 includes a housing 22, a bias member 26 and an o-ring 28 between the housing 22 and the carbon seal element 24. It is to be understood that various mount arrangements may alternatively or additionally be provided, such as within a gas turbine engine accessory gearbox.

The bias member 26, such as a spring assembly or wave washer, axially biases the carbon seal element 24 along the direction of the central axis A to form a stationary-rotational interface between the seal face of the second end 24A and another structure (not shown).

The o-ring 28 is located adjacent to the inner step surface 30 axially displaced from the bias member 26 at a distance H1. Thus, the axial distance H1 is the distance from the first end 24' to the inner step surface 30. The outer step surface 32 is axially displaced from the bias member 26 at a distance H2. In this example, the outer step surface 32 is axially between the first end 24' and the second end 24A. The axial distance H2 is the distance from the first end 24' to the outer step surface 32. An overall axial length of the carbon seal element 24 extends over an axial distance H3 from the first end 24' to the second end 24A. The inner step surface 30 defines an annular cavity to receive the o-ring 28 at least partially therein.

In the illustrated example, the housing 22 includes a wall 22A. In one example, the wall 22A is a continuous, monolithic piece and includes a portion 22B that is adjacent to and seals against the o-ring 28, a portion 22C that extends around the first end 24' and a portion 22D that extends along an outer side of the carbon seal element 24. The bias member 26 is located between the first end 24' and the portion 22C of the housing 22.

Detailed root cause investigation has determined that the o-ring cavity height dimension (H1) in oil-side carbon seal elements impacts the ability of the carbon seal element 24 to provide an adequate seal with the mating component (not shown).

In one disclosed non-limiting dimensional embodiment, the distance H1 is between 0.1198-0.1210 inches (3.04-3.07 mm) and may nominally be 0.12 inches (3.048 mm); distance H2 is between 0.20-0.22 inches (5.1-5.6 mm) and may nominally be 0.21 inches (5.3 mm); and distance H3 is 0.330-0.333 inches (8.4-8.5 mm); the o-ring 28 defines a cross-sectional thickness D2 between 0.070-0.075 inches (1.78-1.91 mm) and may nominally be 0.072 inches (1.83 mm).

In one disclosed non-limiting dimensional embodiment, a ratio H1/D2 (the distance H1 divided by the distance D2) is between 1.60-1.73. The selected ratio H1/D2 of the carbon seal element 24 achieves an unexpected reduction in leakage. For example, oil-leakage is reduced by up to 76%. One difference in this technology is the level of control provided by this internal parameter. Thus, a method for controlling leakage in the carbon seal assembly 20 includes limiting leakage of a fluid by the o-ring 28 by establishing the ratio H1/D2 to be between 1.60-1.73.

In further disclosed non-limiting dimensional embodiments that represent the relative position of the inner step surface 30 and/or outer step surface 32, H1 is greater than or equal to 35% of the axial distance H3 and/or H2 is greater than or equal to 60% of the axial distance H3.

Although a combination of features is shown in the illustrated examples, not all of them need to be combined to realize the benefits of various embodiments of this disclosure. In other words, a system designed according to an embodiment of this disclosure will not necessarily include all of the features shown in any one of the FIGURES or all of the portions schematically shown in the FIGURES. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A carbon seal assembly comprising:
   a carbon seal element disposed about a central axis and extending between a first end and a second end, the carbon seal element including an inner step surface at an axial distance H1 with regard to the first end; and
   an o-ring adjacent to the inner step surface, the o-ring including a cross-section diameter D2 such that a ratio H1/D2 is between 1.60-1.73.

2. The carbon seal assembly as recited in claim 1, wherein the carbon seal element includes an outer step surface.

3. The carbon seal assembly as recited in claim 2, wherein the outer step surface is substantially perpendicular to the central axis.

4. The carbon seal assembly as recited in claim 1, wherein the carbon seal element includes an outer step surface located at an axial position between the inner step surface and the second end.

5. The carbon seal assembly as recited in claim 1, including a bias member arranged to bias the carbon seal element in a direction along the central axis.

6. The carbon seal assembly as recited in claim 1, including a bias member adjacent the first end.

7. The carbon seal assembly as recited in claim 1, including a housing arranged adjacent the o-ring such that the o-ring seals between the carbon seal element and the housing.

8. The carbon seal assembly as recited in claim 7, wherein the housing has a wall extending adjacent the o-ring, around the first end and along an outer side of the carbon seal element, and a bias member between the first end and the housing.

9. The carbon seal assembly as recited in claim 1, including an axial distance H3 extending from the first end to the second end, and H1 is greater than or equal to 35% of the axial distance H3.

10. The carbon seal assembly as recited in claim 1, wherein the carbon seal element includes an outer step surface located at an axial distance H2 from the first end and an axial distance H3 from the first end to the second end, and H2 is greater than or equal to 60% of the axial distance H3.

11. The carbon seal assembly as recited in claim 1, wherein the inner step surface is substantially perpendicular to the central axis.

12. A carbon seal assembly comprising:
    a carbon seal element disposed about a central axis and extending between a first end and a second end, the carbon seal element including an inner step surface, an outer step surface, an axial distance H1 from the first end to the inner step surface, an axial distance H2 from the first end to the outer step surface and an axial distance H3 from the first end to the second end, and H1 is greater than or equal to 35% of the axial distance H3 and H2 is greater than or equal to 60% of the axial distance H3.

13. The carbon seal assembly as recited in claim 12, including an o-ring adjacent to the inner step surface.

14. The carbon seal assembly as recited in claim 13, wherein the o-ring includes a cross-section diameter D2 such that a ratio H1/D2 is between 1.60-1.73.

15. The carbon seal assembly as recited in claim 12, wherein the inner step surface is substantially perpendicular to the central axis.

16. The carbon seal assembly as recited in claim 12, wherein the outer step surface is substantially perpendicular to the central axis.

17. A method for controlling leakage in a carbon seal assembly, the method comprising:
    providing a carbon seal element disposed about a central axis and extending between a first end and a second end, the carbon seal element including an inner step surface at an axial distance H1 with regard to the first end and an o-ring adjacent to the inner step surface, the o-ring including a cross-section diameter D2; and
    limiting leakage of a fluid by the o-ring by establishing a ratio H1/D2 that is between 1.60-1.73.

18. The carbon seal assembly as recited in claim 1, wherein the ratio H1/D2 of between 1.60-1.73 is selected to control leakage of a fluid by the o-ring.

19. The carbon seal assembly as recited in claim 1, wherein the ratio H1/D2 of between 1.60-1.73 is selected to reduce leakage of a fluid by the o-ring.

20. The carbon seal assembly as recited in claim 14, wherein the ratio H1/D2 of between 1.60-1.73 is selected to control leakage with respect to an o-ring adjacent to the inner step surface.

* * * * *